US012457454B2

(12) United States Patent
Cai et al.

(10) Patent No.: US 12,457,454 B2
(45) Date of Patent: Oct. 28, 2025

(54) SPEAKER MODULE AND ELECTRONIC DEVICE

(71) Applicant: GOERTEK INC., Shandong (CN)

(72) Inventors: Xiaodong Cai, Shandong (CN); Song Liu, Shandong (CN); Yanyan Hou, Shandong (CN)

(73) Assignee: GOERTEK INC., Weifang (CN)

( * ) Notice: Subject to any disclaimer, the term of this patent is extended or adjusted under 35 U.S.C. 154(b) by 220 days.

(21) Appl. No.: 18/259,084

(22) PCT Filed: Dec. 6, 2021

(86) PCT No.: PCT/CN2021/135745
§ 371 (c)(1),
(2) Date: Jun. 23, 2023

(87) PCT Pub. No.: WO2022/135126
PCT Pub. Date: Jun. 30, 2022

(65) Prior Publication Data

US 2024/0048913 A1 Feb. 8, 2024

(30) Foreign Application Priority Data

Dec. 24, 2020 (CN) ........................ 202023171977.X

(51) Int. Cl.
*H04R 9/06* (2006.01)
*H04R 1/02* (2006.01)
(Continued)

(52) U.S. Cl.
CPC ............... *H04R 9/06* (2013.01); *H04R 1/023* (2013.01); *H04R 1/025* (2013.01); *H04R 1/028* (2013.01);
(Continued)

(58) Field of Classification Search
CPC .......... H04R 9/06; H04R 1/023; H04R 1/025; H04R 1/028; H04R 1/288; H04R 7/04;
(Continued)

(56) References Cited

U.S. PATENT DOCUMENTS 9,525,933 B2 * 12/2016 Chen .................... H04R 1/2842
9,838,798 B2 * 12/2017 Mao ........................ H04R 9/063
(Continued)

FOREIGN PATENT DOCUMENTS

CN 109981856 A * 7/2019 ............... B06B 1/02
CN 209448890 U * 9/2019
CN 214901294 U 11/2021
WO 2018095047 A1 5/2018

OTHER PUBLICATIONS

International Search Report from International Application No. PCT/CN2021/135745 mailed Mar. 1, 2022.

*Primary Examiner* — Oyesola C Ojo
(74) *Attorney, Agent, or Firm* — Shih IP Law Group, PLLC

(57) ABSTRACT

A speaker module and an electronic device are disclosed, comprises a module casing, a speaker unit and a linear motor module. The module casing is provided with a mounting cavity; the speaker unit is provided in the mounting cavity and comprises a magnetic circuit system provided with a mounting groove; the linear motor module is provided in the mounting cavity and comprises a housing, a coil and a vibrating assembly; the housing comprises a body part and a protrusion protruding outward; the body part is at a bottom of the magnetic circuit system; the protrusion extends into the mounting groove; the coil is provided in the protrusion part; the vibrating assembly is provided in the body part. The overall structure of the speaker module may be more com-
(Continued)

pact, the speaker unit and the linear motor module may be controlled independently which improves the use effect of the speaker module.

11 Claims, 4 Drawing Sheets

(51) Int. Cl.

| | |
|---|---|
| ***H04R 1/28*** | (2006.01) |
| ***H04R 7/04*** | (2006.01) |
| ***H04R 7/18*** | (2006.01) |
| ***H04R 9/02*** | (2006.01) |
| ***H04R 9/04*** | (2006.01) |

(52) U.S. Cl.
CPC ............... *H04R 1/288* (2013.01); *H04R 7/04* (2013.01); *H04R 7/18* (2013.01); *H04R 9/025* (2013.01); *H04R 9/045* (2013.01); *H04R 2400/03* (2013.01); *H04R 2499/11* (2013.01)

(58) Field of Classification Search
CPC .......... H04R 7/18; H04R 9/025; H04R 9/045; H04R 2400/03; H04R 2499/11; H04R 1/02; H04R 1/24; H04R 1/2834
See application file for complete search history.

(56) References Cited

U.S. PATENT DOCUMENTS

| | | | | |
|---|---|---|---|---|
| 10,149,061 | B2 * | 12/2018 | Liu | H04R 9/06 |
| 10,149,062 | B2 * | 12/2018 | Zhang | H04R 1/06 |
| 10,264,335 | B1 * | 4/2019 | Ren | H04R 9/06 |
| 11,483,637 | B2 * | 10/2022 | Moon | G06F 1/1686 |
| 12,212,905 | B2 * | 1/2025 | Park | H04R 9/02 |
| 2008/0298628 | A1 * | 12/2008 | Lim | H04R 9/045 381/386 |
| 2012/0275637 | A1 * | 11/2012 | Liao | H04R 1/025 381/395 |
| 2013/0094685 | A1 * | 4/2013 | Seo | H04R 1/021 381/332 |
| 2014/0119591 | A1 * | 5/2014 | Meng | H04R 9/04 381/386 |
| 2014/0301587 | A1 * | 10/2014 | Ji | H04R 1/025 381/332 |
| 2017/0134848 | A1 * | 5/2017 | Shao | H04R 7/18 |
| 2017/0208386 | A1 * | 7/2017 | Yang | H04R 1/288 |
| 2017/0245032 | A1 * | 8/2017 | Yoon | H04R 1/345 |
| 2018/0234771 | A1 * | 8/2018 | Hsieh | H02K 33/12 |
| 2018/0297074 | A1 * | 10/2018 | Huang | B06B 1/045 |
| 2019/0058933 | A1 * | 2/2019 | Huo | H04R 1/021 |
| 2019/0320253 | A1 * | 10/2019 | Park | H04R 1/028 |
| 2020/0213741 | A1 * | 7/2020 | Shen | H04R 1/345 |
| 2022/0150638 | A1 * | 5/2022 | Song | H04R 7/20 |
| 2022/0174420 | A1 * | 6/2022 | Song | H04R 9/04 |

* cited by examiner

SPEAKER MODULE AND ELECTRONIC DEVICE

TECHNICAL FIELD

The disclosure relates to a technical field of electroacoustic devices, in particular to a speaker module and an electronic device.

DESCRIPTION OF RELATED ART

With the rapid development of the consumer electronics industry, especially smart phones, end consumers have higher and higher requirements for device experience. In addition to the experience demand for vision, the experience demands for auditory and tactile are gradually increased. In this context, mobile phone manufacturers have put forward higher performance requirements for a speaker module of an acoustic device and a vibration motor of a tactile feedback device.

In traditional design solutions, the performance improvements of the speaker module and the motor are generally achieved by increasing the size of the product. However, as the internal spaces of electronic devices become more and more compact, batteries, motherboards and cameras take up more and more spaces. This in turn requires that the sizes of the speaker module and the vibration motor cannot be increased or even decreased, thus creating a conflict with the demand for performance improvement.

In order to solve the above-mentioned problems, in the related art, a technical solution of combining the speaker module and the vibration motor together is proposed, that is, the speaker module and the vibration motor share one driving coil, and the diaphragm of the speaker module and the vibrator of the vibration motor vibrate in the same direction, which causes that as long as the coil is supplied with electricity, the speaker module and the vibration motor can only work at the same time due to the action force and reaction force between the coil and the magnetic circuit, so it cannot meet the diverse application scenarios of mobile phones, such as only ringing without vibrating or only vibrating without ringing. Although low-frequency music signals below a resonance frequency of the vibration motor can be filtered in the form of signal filtering, the vibration of the vibration motor cannot be completely eliminated, and the sound quality of the speaker is poor because the music signal basically has no low-frequency effect.

SUMMARY

The disclosure is provided to solve at least one of the technical problems existing in the prior art. For this reason, the disclosure proposes a speaker module, which has the advantages of compact structure and capable of reducing the occupied space under the premise of meeting the performance requirement.

The disclosure also proposes an electronic device including the above-mentioned speaker module.

The speaker module according to an embodiment of the disclosure includes: a module casing provided with a mounting cavity therein; a speaker unit provided in the mounting cavity and dividing the mounting cavity into a front acoustic cavity and a rear acoustic cavity, wherein the speaker unit comprises a magnetic circuit system provided with a mounting groove; and a linear motor module provided in the mounting cavity and comprising a housing, a coil and a vibrating assembly, wherein the housing comprises a body part and a protrusion protruding outward from the body part, the body part is located at a bottom of the magnetic circuit system and connected to a bottom wall of the module casing, the protrusion extends into the mounting groove, the coil is provided in the protrusion, and the vibrating assembly is provided in the body part.

According to the speaker module of the embodiment of the disclosure, by providing t the mounting groove in the magnetic circuit system of the speaker unit and by providing t the protrusion of the linear motor module in the mounting groove, the stacking height of the speaker unit and the linear motor module may be reduced, which makes the overall structure of the speaker module more compact and the speaker module occupies a smaller mounting volume. Moreover, the speaker unit and the linear motor module may be controlled independently, which improves the use effect of the speaker module.

According to some embodiments of the disclosure, the magnetic circuit system comprises: a central magnetic circuit part connected to a top portion of the housing, and comprising a central magnetic steel and a central magnetic conducting plate covered on the central magnetic steel, wherein the mounting groove is provided in the central magnetic circuit part; and a side magnetic circuit part provided around the central magnetic circuit part and comprising a side magnetic steel and a side magnetic conducting plate covered on the side magnetic steel, wherein the side magnetic steel and the side magnetic conducting plate are spaced apart from the central magnetic steel and the central magnetic conducting plate to define a magnetic gap.

According to some embodiments of the disclosure, the speaker unit comprises a vibration system comprising a diaphragm and a voice coil having one end connected to the diaphragm and another end extending into the magnetic gap.

According to some embodiments of the disclosure, the mounting groove passes through the central magnetic circuit part in a vertical direction, and a distance between the protrusion and the diaphragm is not greater than a distance between the central magnetic circuit part and the diaphragm.

According to some embodiments of the disclosure, the module casing comprises a module upper casing and a module lower casing which comprises a bottom wall, an annular side wall connected to the bottom wall and a partition wall located in a space enclosed by the annular side wall, the partition wall is connected to the bottom wall and the annular side wall, and a ventilation hole is provided on the partition wall; wherein an edge part of the diaphragm comprises an upper surface and a lower surface, wherein the lower surface is sealed and connected to top surfaces of the annular side wall and the partition wall, and the upper surface is sealed and connected to the module upper casing; and a front acoustic cavity is formed by the diaphragm and the module upper casing and a rear acoustic cavity is formed by the diaphragm, the module upper casing and the module lower casing, wherein the rear acoustic cavity is divided by the partition wall into an assembly cavity close to the diaphragm and a cushion cavity away from the diaphragm, and the magnetic circuit system is provided in the assembly cavity.

According to some embodiments of the disclosure, the module upper casing and/or the module lower casing made of metal; and a position of the module upper casing corresponding to the edge part of the diaphragm is provided with a concave part protruding toward the edge part, and a bottom surface of the concave part is sealed and connected to the upper surface of the edge part.

According to some embodiments of the disclosure, the cushion cavity is filled with sound-absorbing particles, and the partition wall is provided with an isolating mesh cloth covering the ventilation hole.

According to some embodiments of the disclosure, the side magnetic circuit part is connected to a bottom wall of the module casing, and the side magnetic circuit part is spaced apart from a side wall of the housing; or the side magnetic circuit part is connected to the top portion of the housing.

According to some embodiments of the disclosure, the central magnetic steel comprises a first magnetic steel and a second magnetic steel, and the first magnetic steel and the second magnetic steel are fixed on two sides of the protrusion respectively; or the central magnetic steel is formed as an annular shape and sleeved on the protrusion.

According to some embodiments of the disclosure, the vibrating assembly comprises: a vibrator assembly provided in the body part and comprising a permanent magnet and a weight block, wherein the coil is supplied with electricity to drive the vibrator assembly to move in a horizontal direction; and an elastic sheet assembly suspending the vibrator assembly in the body part and having elastic deformation in the horizontal direction.

According to some embodiments of the disclosure, the module casing is provided with an air outlet hole communicating with the rear acoustic cavity, an auxiliary diaphragm is provided at the air outlet hole, and a protective cover is provided on the outside of the auxiliary diaphragm.

An electronic device according to an embodiment of the disclosure comprises the speaker module according to any one of the above-mentioned embodiments.

According to the electronic device of the embodiment of the disclosure, by providing the above-mentioned speaker module, the speaker module has a relatively compact structure and occupies a smaller assembly space, so that the electronic device may be made thinner. Moreover, the speaker unit and the linear motor module in the speaker module may be controlled independently, thereby improving the sound effect and the vibration effect of the electronic device, and thus improving user experience.

Additional aspects and advantages of the disclosure will be set forth in the description which follows, and in part will be obvious from the description, or may be learned by practice of the disclosure.

BRIEF DESCRIPTION OF DRAWINGS

The above aspects and/or the additional aspect and advantage of the disclosure will become obvious and easy to understand from the description of the embodiments in conjunction with the following drawings, wherein.

Figure 1:
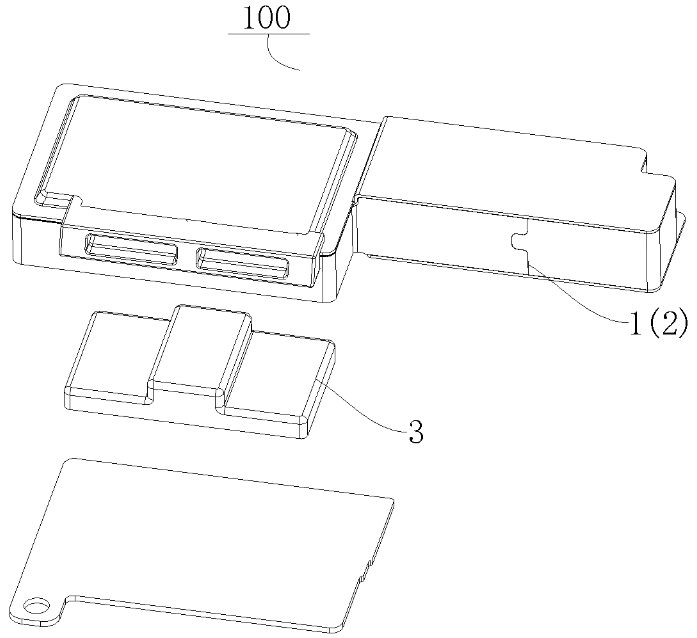
FIG. 1 is a schematic diagram of an exploded structure of a speaker module according to an embodiment of the disclosure.

REFERENCE NUMBERS speaker module 100, module casing 1, mounting cavity 1*a*, front acoustic cavity 1*b*, rear acoustic cavity 1*c*, assembly cavity 1*d*, cushion cavity 1*e*, air outlet hole 1*f*, module upper casing 11, concave part 111, module lower casing 12, bottom wall 121, annular side wall 122, partition wall 123, ventilation hole 123*a*, isolation mesh cloth 13, speaker unit 2, magnetic circuit system 21, mounting groove 21*a*, magnetic gap 21*b*, central magnetic circuit part 211, central magnetic steel 2111, first magnetic steel 2111*a*, second magnetic steel 2111*b*, central magnetic conducting plate 2112, side magnetic circuit part 212, side magnetic steel 2121, side magnetic conducting plate 2122, vibration system 22, diaphragm 221, voice coil 222, sound-absorbing particle 23, auxiliary diaphragm 24, protective cover 25, linear motor module 3, housing 31, body part 311, protrusion 312, coil 32, vibrating assembly 33, vibrator assembly 331, permanent magnet 3311, weight block 3312, assembly groove 3312*a*, magnetic conducting magnet 3313, elastic sheet assembly 332, iron core 34, magnetic conducting plate 35.

DETAILED DESCRIPTIONS

Embodiments of the disclosure are described in detail below, examples of which are shown in the drawings, wherein the same or similar reference numbers represent the same or similar components or components having the same or similar functions throughout the specification. The embodiments described below with reference to the drawings are exemplary and are only used to explain the disclosure, and should not be construed as limiting the disclosure.

Hereinafter, a speaker module 100 according to an embodiment of the disclosure will be described with reference to FIGS. 1-6. The speaker module 100 can be used in an electronic device.

Here, a mounting cavity 1*a* may be provided in a module casing 1, and a speaker unit 2 is provided in the mounting cavity 1*a* and the mounting cavity 1*a* is divided into a front acoustic cavity 1*b* and a rear acoustic cavity 1*c* by the speaker unit 2. The speaker unit 2 includes a magnetic circuit system 21 provided with a mounting groove 21*a*. A linear motor module 3 is provided in the mounting cavity 1*a*. The linear motor module 3 may include a housing 31, a coil 32 and a vibrating assembly 33. The housing 31 includes a body part 311 and a protrusion 312 protruding outward from the body part 311. The body part 311 is located at a bottom of the magnetic circuit system 21 and is connected to a bottom wall 121 of the module casing 1, the protrusion 312 extends into the mounting groove 21*a*, the coil 32 may be provided in the protrusion 312, and the vibrating assembly 33 may be provided in the body part 311.

Specifically, the protrusion 312 of the housing 31 may extend towards a direction close to the magnetic circuit system 21 and may extend into the mounting groove 21*a*, and the body part 311 is located below the magnetic circuit system 21 and is connected to the magnetic circuit system 21. Thus, by the above arrangement, the speaker unit 2 and the linear motor module 3 may be stacked together, thus the stacking height of the speaker unit 2 and the linear motor module 3 may be reduced, the overall structure of the speaker module 100 may be more compact, the occupied mounting volume is smaller, the mounting space reserved for the speaker module 100 by the electronic device may be reduced, and the electronic device may be made thinner. When the speaker module 100 operates, the speaker unit 2 and the linear motor module 3 may be controlled independently, that is, different electrical signals may be input to the speaker unit 2 and the linear motor module 3 respectively to realize their separate operation or synchronous operation without influence with each other, so that the use effect of the speaker module 100 is improved.

Figure 3:
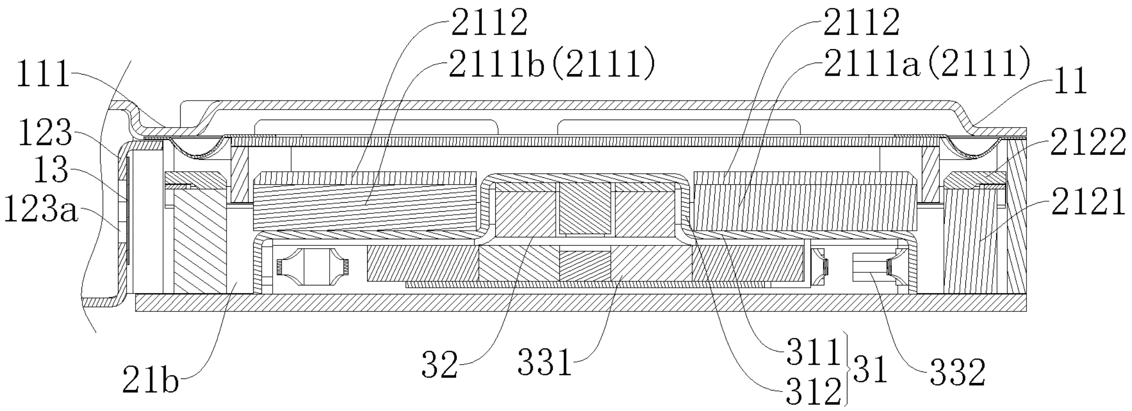
FIG. 3 is a schematic diagram of a partial structure of a speaker module according to an embodiment of the disclosure.

In a specific example as shown in FIG. 3, the housing 31 of the linear motor module 3 is in a convex shape, a width of the body part 311 is greater than a width of the protrusion 312, the coil 32 is fixed in the protrusion 312, and the vibrating assembly 33 is provided in the body part 311. When the linear motor module 3 operates, the coil 32 is supplied with an alternating current, and the vibrating assembly 33 may be driven to reciprocating move in the body part 311 under the action of the magnetic field force, thereby generating a vibration feeling. It may be understood that, through the above-mentioned structural arrangement, the vibration space of the vibrating assembly 33 may be larger, and the vibration feeling of the linear motor module 3 may be improved.

According to the speaker module 100 of the embodiment of the disclosure, by providing the mounting groove 21*a* in the magnetic circuit system 21 of the speaker unit 2 and by providing the protrusion 312 of the linear motor module 3 in the mounting groove 21*a*, the stacking height of the speaker unit 2 and the linear motor module 3 may be reduced, so that the overall structure of the speaker module 100 is more compact and the speaker module 100 occupies a smaller mounting volume. Moreover, the speaker unit 2 and the linear motor module 3 may be controlled independently, which improves the use effect of the speaker module 100.

Figure 2:
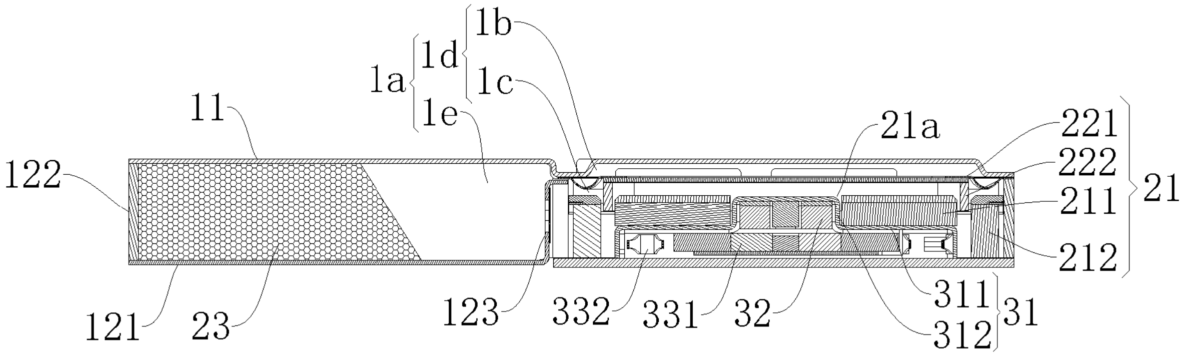
FIG. 2 is a vertical sectional view of a speaker module according to an embodiment of the disclosure.

As shown in FIGS. 2-3, according to some embodiments of the disclosure, the magnetic circuit system 21 may include a central magnetic circuit part 211 and a side magnetic circuit part 212, wherein the central magnetic circuit part 211 may be connected to a top portion of the housing 31 and includes a central magnetic steel 2111 and a central magnetic conducting plate 2112 covered on the central magnetic steel 2111, the mounting groove 21*a* may be provided in the central magnetic circuit part 211, and the side magnetic circuit part 212 provided around the central magnetic circuit part 211 and includes a side magnetic steel 2121 and a side magnetic conducting plate 2122 covered on the side magnetic steel 2121, which are respectively spaced apart from the central magnetic steel 2111 and the central magnetic conducting plate 2112 to define a magnetic gap 21*b*.

Optionally, the mounting groove 21*a* may be provided at the center of the central magnetic circuit part 211, so that the assembled structure of the speaker unit 2 and the linear motor module 3 may be more symmetrical, and the structural stability of the speaker module 100 may be improved. Optionally, the body part 311 of the housing 31 may be made of magnetically conductive material, so that the body part 311 may serve as a magnetic conducting yoke of the central magnetic circuit part 211, which may enhance the magnetic conducting effect and increase the magnetic field strength of the magnetic circuit system 21.

As shown in FIG. 3, in some embodiments of the disclosure, the speaker unit 2 also includes a vibration system 22, and the vibration system 22 may include a diaphragm 221 and a voice coil 222 having one end connected to the diaphragm 221 and another end extending into the magnetic gap 21*b*. Specifically, when the speaker unit 2 operates, an alternating current is supplied to the voice coil 222. Since one end of the voice coil 222 extends into the magnetic gap 21*b*, the voice coil 222 drives the diaphragm 221 to vibrate up and down under the action of the magnetic field force, thereby achieving the effect of vibrating and producing sound for the diaphragm 221.

In some embodiments of the disclosure, the mounting groove 21*a* may pass through the central magnetic circuit part 211 in a vertical direction, and a distance between the protrusion 312 and the diaphragm 221 is not greater than a distance between the central magnetic circuit part 211 and the diaphragm 221. It may be understood that, since the distance between the linear motor module 3 and the diaphragm 221 is less than or equal to the distance between the central magnetic circuit part 211 and the diaphragm 221, the diaphragm 221 may be prevented from colliding the linear motor module 3 during vibration, thereby ensuring that the diaphragm 221 to operate normally.

It should be noted that the mounting groove 21*a* may not pass through the central magnetic circuit part 211, as long as the protrusion 312 can be embedded in the central magnetic circuit part 211, and the disclosure does not make any specific restrictions to the providing method of the mounting groove 21*a*.

In a specific example of the disclosure, the vibration system 22 may also include a centering auxiliary structure having one end fixed to a frame of the speaker unit 2 and the other end connected to at least one of the voice coil 222 or the diaphragm 221 or the like. When the vibration system 22 operates, the centering auxiliary structure vibrates synchronously with the voice coil 222 and the diaphragm 221, which can stabilize the vibration system 22 and prevent swing vibration, thereby preventing polarization.

In some embodiments of the disclosure, the side magnetic circuit part 212 may be connected to a bottom wall 121 of the module casing 1, and the side magnetic circuit part 212 is spaced apart from the side wall of the housing 31. Alternatively, the side magnetic circuit part 212 may be connected to the top portion of the housing 31. That is, the central magnetic circuit part 211 may be provided on the top portion of the body part 311 of the housing 31, the side magnetic circuit part 212 may be provided at the bottom of the module casing 1 and spaced apart from the body part 311. Alternatively, both of the central magnetic circuit part 211 and the side magnetic circuit part 212 may also be provided on the top portion of the body part 311, and the central magnetic circuit part 211 is spaced apart from the side magnetic circuit part 212. Therefore, by the above-mentioned arrangement, the assembly flexibility between the magnetic circuit system 21 and the linear motor module 3 may be enhanced, and the assembly form may be adjusted according to the size of the actual assembly space.

In some embodiments of the disclosure, the central magnetic steel 2111 may include a first magnetic steel 2111*a* and a second magnetic steel 2111*b*, and the first magnetic steel 2111*a* and the second magnetic steel 2111*b* are fixed on two sides of the protrusion 312 respectively. Alternatively, the central magnetic steel 2111 is formed as an annular shape and sleeved on the protrusion 312. It should be noted that the arrangement form of the central magnetic steel 2111 is not limited thereto. For example, the protrusion 312 may be formed as a polyhedral shape, and the central magnetic steel 2111 may also include a plurality of sub-magnetic steels, and the plurality of sub-magnetic steels are provided in one-to-one correspondence to multiple sides of the protrusion 312.

Figure 5:
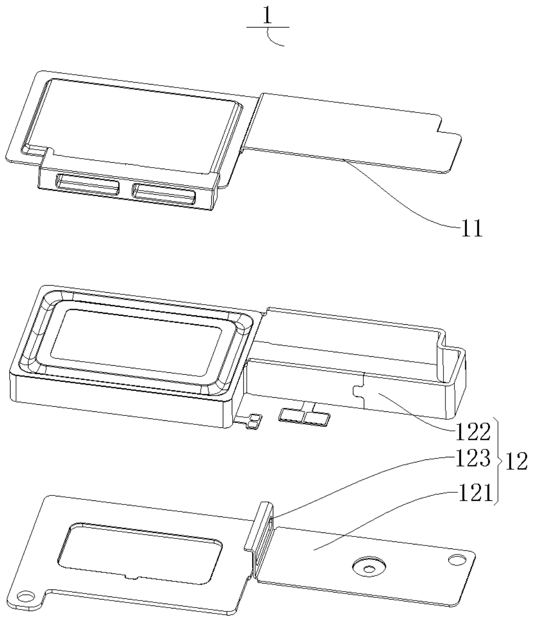
FIG. 5 is an exploded view of a module casing according to an embodiment of the disclosure.

As shown in FIG. 3 and FIG. 5, in some embodiments of the disclosure, the module casing 1 may include a module upper casing 11 and a module lower casing 12, and the module lower casing 12 includes a bottom wall 121, an annular side wall 122 connected to the bottom wall 121 and a partition wall 123 located in a space surrounded by the annular side wall 122. The partition wall 123 is connected to the bottom wall 121 and the annular side wall 122, and the partition wall 123 is provided with a ventilation hole 123*a*. An edge part of the diaphragm 221 may include an upper surface and a lower surface, the lower surface is sealed and connected to the top surfaces of the annular side wall 122 and the partition wall 123, and the upper surface is sealed and connected to the module upper casing 11. A front acoustic cavity 1*b* is formed by the diaphragm 221 and the module upper casing 11, and a rear acoustic cavity 1*c* is formed by the diaphragm 221, the module upper casing 11 and the module lower casing 12. The partition wall 123 separates the rear acoustic cavity 1*c* into an assembly cavity 1*d* close to the diaphragm 221 and a cushion cavity 1*e* away from the diaphragm 221, and the magnetic circuit system 21 is provided in the assembly cavity 1*d*.

Specifically, the module lower casing 12 includes a bottom wall 121 and an annular side wall 122 connected to the bottom wall 121. The module upper casing 11 may define a mounting cavity 1*a* together with the bottom wall 121 and the annular side wall 122. The module lower casing 12 also includes a partition wall 123, the partition wall 123 is connected with the bottom wall 121 and the annular side wall 122 respectively and separates the mounting cavity 1*a* into an assembly cavity 1*d* and a cushion cavity 1*e*, wherein the speaker unit 2 and the linear motor module 3 may be provided in the mounting cavity 1*a*. Here, since the edge part of the diaphragm 221 is connected to the top surfaces of the annular side wall 122 and the partition wall 123, the front acoustic cavity 1*b* and the rear acoustic cavity 1*c* may be separated by the diaphragm 221, for preventing the front and rear sound waves from short-circuiting, and improving sound quality of the speaker module 100. Moreover, the above arrangement may also increase the radiation area of the diaphragm 221 and improve the sound generation performance of the speaker module 100. In addition, since the rear acoustic cavity 1*c* is sealed, the airflow may not enter the electronic product to cause resonance in the housing of the electronic product, thereby improving the user's experience of the electronic product.

Optionally, as shown in FIG. 2, the cushion cavity 1*e* may be filled with sound-absorbing particles 23, the partition wall 123 may be provided with an isolation mesh cloth 13 covering the ventilation hole 123*a* and the isolation mesh 13 may prevent the sound-absorbing particles 23 from entering the assembly cavity 1*d*, so as to prevent the sound-absorbing particles 23 from damaging the speaker unit 2. The sound-absorbing particles 23 in the cushion cavity 1*e* may absorb the air molecules entering the cushion cavity 1*e*, which may virtually increase the volume of the rear acoustic cavity 1*c* and may improve the low-frequency performance of the speaker module 100.

In some embodiments of the disclosure, the module upper casing 11 and/or the module lower casing 12 may be made of metal, and a position of the module upper casing 11 corresponding to the edge part of the diaphragm 221 is provided with a concave part 111 protruding toward the edge part and the bottom surface of the concave part 111 is sealed and connected to the upper surface of the edge part. Specifically, the module upper casing 11 may be made of metal, the module lower casing 12 may also be made of metal, or both of the module upper casing 11 and the module lower casing 12 may be made of metal, which can greatly improve the structural strength of the module casing 1, and also improve the heat dissipation effect of the speaker module 100 since the metal material has better thermal conductivity. In addition, since the module casing 1 is made of a metal material, it is convenient to provide screw holes on the module casing 1, and it is convenient to assemble the speaker module 100 with the electronic device.

Figure 4:
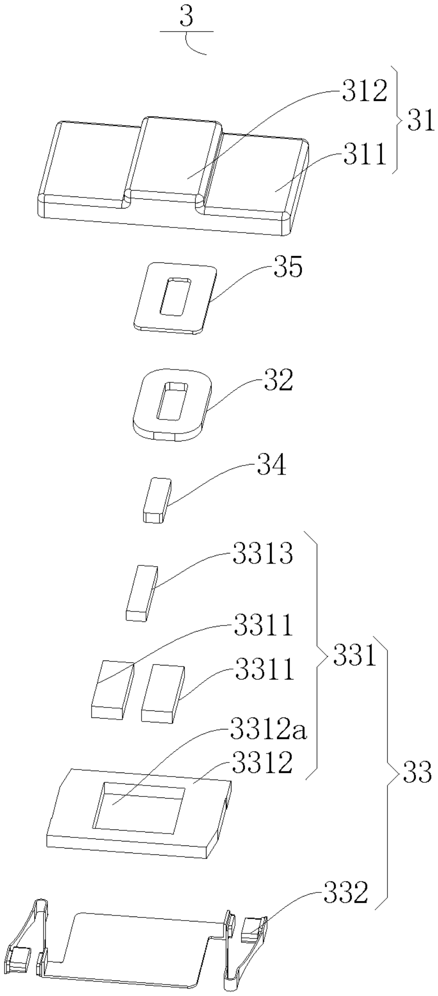
FIG. 4 is an exploded view of a linear motor module according to an embodiment of the disclosure.

As shown in FIG. 4, according to some embodiments of the disclosure, the vibrating assembly 33 may include a vibrator assembly 331 and an elastic sheet assembly 332, wherein the vibrator assembly 331 may be provided in the body part 311, and the vibrator assembly 331 may include a permanent magnet 3311 and a weight block 3312. The coil 32 may be supplied with electricity to drive the vibrator assembly 331 to move in the horizontal direction, the elastic sheet assembly 332 may suspend the vibrator assembly 331 in the body part 311, and the elastic sheet assembly 332 has elastic deformation in the horizontal direction.

Specifically, when the linear motor module 3 operates, an alternating current is supplied into the coil 32, and under the action of the magnetic field force, the vibrator assembly 331 may be driven to move in the horizontal direction. The opposite ends of the elastic sheet assembly 332 are connected to opposite sides of the body part 311 respectively, and the vibrator assembly 331 drives the elastic sheet assembly 332 to deform elastically during movement. Thus, the vibrator assembly 331 reciprocating moves under the action of the elastic force of the elastic piece assembly 332 and the magnetic field force, so as to generate vibration feeling.

Optionally, the weight block 3312 may be a tungsten steel block, so that the vibration feeling of the vibrator assembly 331 may be well improved. Optionally, an assembly groove 3312*a* may be provided on the weight block 3312, and the permanent magnet 3311 may be embedded in the assembly groove 3312*a*.

In the specific example shown in FIGS. 3-4, an assembly groove 3312*a* is provided on the weight block 3312, and there are two permanent magnets 3311 embedded in the assembly groove 3312*a*. Here, the vibrator assembly 331 also includes a permeable magnet 3313, the magnetization direction of the permeable magnet 3313 is perpendicular to the magnetization direction of the permanent magnet 3311, and the permeable magnet 3313 is provided between two permanent magnets 3311 and embedded in the assembly groove 3312*a*. As shown in FIG. 3, the linear motor module 3 also includes an iron core 34 provided at the center of the coil 32 and a magnetic conducting plate 35 covered on the coil 32, thereby increasing the BL value of the magnetic field and further improving the vibration feeling of the linear motor module 3.

Figure 6:
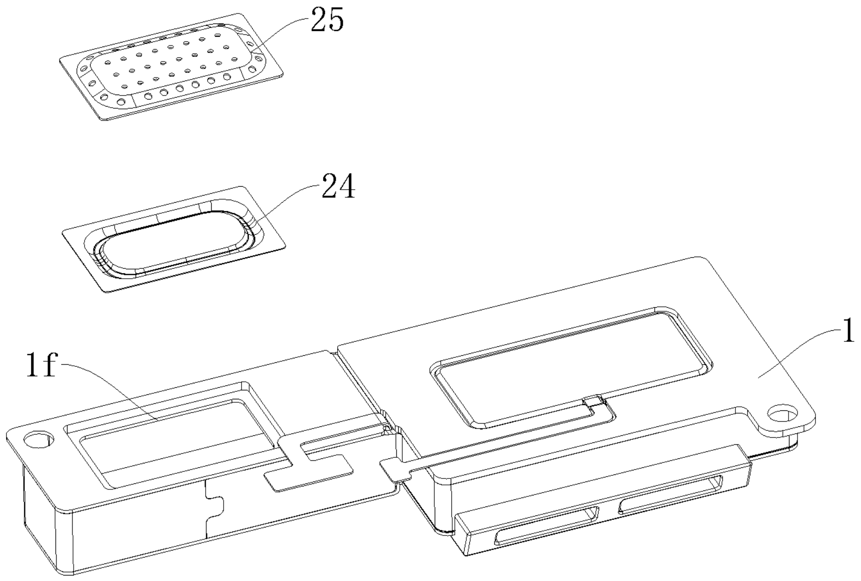
FIG. 6 is a schematic diagram of the assembled state of the auxiliary diaphragm, the protective cover and the module casing according to an embodiment of the disclosure.

As shown in FIG. 6, according to some embodiments of the disclosure, the module casing 1 may be provided with an air outlet hole if communicating with the rear acoustic cavity 1*c*, an auxiliary diaphragm 24 may be provided at the air outlet hole 1*f*, and a protective cover 25 is provided on the outside of the auxiliary diaphragm 24, thereby forming a flexible rear acoustic cavity system, which may increase the volume and compliance of the rear acoustic cavity 1*c* and thus improve the low-frequency effect of the speaker module 100.

The electronic device according to the embodiment of the disclosure includes the speaker module 100 according to the above-mentioned embodiments of the disclosure. Optionally, the electronic device may be a mobile phone, a Tablet, a notebook computer, or the like.

According to the electronic device of the embodiment of the disclosure, by providing the above-mentioned speaker module 100, the speaker module has a relatively compact structure and occupies a smaller assembly space, so that the electronic device may be made thinner. Moreover, the speaker unit 2 and the linear motor module 3 in the speaker module 100 may be independently controlled, thereby improving the sound effect and the vibration effect of the electronic device, and thus improving user experience.

In describing the disclosure, it should be understood that the orientation or positional relationship indicated by terms "center", "longitudinal", "transverse", "length", "width", "thickness", "upper", "lower", "front", "back", "left", "right", "vertical", "horizontal", "top", "bottom", "inner", "outer", "clockwise", "counterclockwise", "axial", "radial", "circumferential", etc. is based on the orientation or positional relationship as shown in the drawings, and is only for the convenience of describing the disclosure and simplifying the description, rather than indicating or implying the referred device or components necessarily have a particular orientation or are configured and operate in a particular orientation, and thus should not be construed as limiting the disclosure. In addition, the features defined by "first" and "second" may explicitly or implicitly include one or more of these features. In the description of the disclosure, unless otherwise specified, "plurality" means two or more.

In the description of the disclosure, it should be noted that, unless otherwise clearly defined and limited, the terms "installed", "connected" or "coupled" should be understood in a broad sense, for example, it may be fixed connected or flexibly connected, detachably connected, or integrally connected; it may be mechanically connected or electrically connected; it can be directly connected or indirectly connected through an intermediary; or it may be internal communication of two components. Those of ordinary skill in the art may understand the specific meanings of the above terms in the disclosure in specific situations.

In the description of this specification, references to the terms "one embodiment," "some embodiments," "exemplary embodiments," "example," "specific examples" or "some examples" etc. are intended to mean that specific features, structures, materials or characteristics described with reference to the embodiments or examples are included in at least one embodiment or example of the disclosure. In this specification, schematic representations of the above terms do not necessarily refer to the same embodiment or example. Furthermore, the specific features, structures, materials or characteristics described may be combined in any suitable manner in any one or more embodiments or examples.

Although the embodiments of the disclosure have been shown and described, those skilled in the art may understand that various changes, modifications, substitutions and modifications, the scope of the disclosure is defined by the claims and their equivalents.

What is claimed is:

1. A speaker module, comprising:

a module casing provided with a mounting cavity therein;

a speaker unit provided in the mounting cavity and dividing the mounting cavity into a front acoustic cavity and a rear acoustic cavity, wherein the speaker unit comprises a magnetic circuit system provided with a mounting groove; and a linear motor module provided in the mounting cavity and comprising a housing, a coil and a vibrating assembly, wherein the housing comprises a body part and a protrusion protruding outward from the body part, the body part is located at a bottom of the magnetic circuit system and connected to a bottom wall of the module casing, the protrusion extends into the mounting groove, the coil is provided in the protrusion, and the vibrating assembly is provided in the body part, and wherein the vibrating assembly comprises:

a vibrator assembly provided in the body part and comprising a permanent magnet and a weight block, wherein the coil is supplied with electricity to drive the vibrator assembly to move in a horizontal direction; and an elastic sheet assembly suspending the vibrator assembly in the body part and having elastic deformation in the horizontal direction.

2. A speaker module, comprising:

a module casing provided with a mounting cavity therein;

a speaker unit provided in the mounting cavity and dividing the mounting cavity into a front acoustic cavity and a rear acoustic cavity, wherein the speaker unit comprises a magnetic circuit system provided with a mounting groove; and a linear motor module provided in the mounting cavity and comprising a housing, a coil and a vibrating assembly, wherein the housing comprises a body part and a protrusion protruding outward from the body part, the body part is located at a bottom of the magnetic circuit system and connected to a bottom wall of the module casing, the protrusion extends into the mounting groove, the coil is provided in the protrusion, and the vibrating assembly is provided in the body part, and wherein the magnetic circuit system comprises:

a central magnetic circuit part connected to a top portion of the housing, and comprising a central magnetic steel and a central magnetic conducting plate covered on the central magnetic steel, wherein the mounting groove is provided in the central magnetic circuit part; and a side magnetic circuit part provided around the central magnetic circuit part and comprising a side magnetic steel and a side magnetic conducting plate covered on the side magnetic steel, wherein the side magnetic steel and the side magnetic conducting plate are spaced apart from the central magnetic steel and the central magnetic conducting plate to define a magnetic gap.

3. The speaker module according to claim 2, wherein the speaker unit comprises a vibration system comprising a diaphragm and a voice coil having one end connected to the diaphragm and another end extending into the magnetic gap.

4. The speaker module according to claim 3, wherein the mounting groove passes through the central magnetic circuit part in a vertical direction, and a distance between the protrusion and the diaphragm is not greater than a distance between the central magnetic circuit part and the diaphragm.

5. The speaker module according to claim 3, wherein the module casing comprises a module upper casing and a module lower casing which comprises a bottom wall, an annular side wall connected to the bottom wall and a partition wall located in a space enclosed by the annular side wall, the partition wall is connected to the bottom wall and the annular side wall, and a ventilation hole is provided on the partition wall, wherein an edge part of the diaphragm comprises an upper surface and a lower surface, the lower surface is sealed and connected to top surfaces of the annular side wall and the partition wall, and the upper surface is sealed and connected to the module upper casing, and wherein a front acoustic cavity is formed by the diaphragm and the module upper casing and a rear acoustic cavity is formed by the diaphragm, the module upper casing and the module lower casing, the rear acoustic cavity is divided by the partition wall into an assembly cavity close to the diaphragm and a cushion cavity away from the diaphragm, and the magnetic circuit system is provided in the assembly cavity.

6. The speaker module according to claim 5, wherein the module upper casing and/or the module lower casing is made of metal; and wherein a portion of the module upper casing corresponding to the edge part of the diaphragm is provided with a concave part protruding toward the edge part, and a bottom surface of the concave part is sealed and connected to the upper surface of the edge part.

7. The speaker module according to claim 5, wherein the cushion cavity is filled with sound-absorbing particles, and the partition wall is provided with an isolating mesh cloth covering the ventilation hole.

8. The speaker module according to claim 2, wherein the side magnetic circuit part is connected to a bottom wall of the module casing, and the side magnetic circuit part is spaced apart from a side wall of the housing, or wherein the side magnetic circuit part is connected to the top portion of the housing.

9. The speaker module according to claim 2, wherein the central magnetic steel comprises a first magnetic steel and a second magnetic steel, and the first magnetic steel and the second magnetic steel are fixed on two sides of the protrusion respectively, or wherein the central magnetic steel is formed as an annular shape and sleeved on the protrusion.

10. A speaker module, comprising:

a module casing provided with a mounting cavity therein;

a speaker unit provided in the mounting cavity and dividing the mounting cavity into a front acoustic cavity and a rear acoustic cavity, wherein the speaker unit comprises a magnetic circuit system provided with a mounting groove; and a linear motor module provided in the mounting cavity and comprising a housing, a coil and a vibrating assembly, wherein the housing comprises a body part and a protrusion protruding outward from the body part, the body part is located at a bottom of the magnetic circuit system and connected to a bottom wall of the module casing, the protrusion extends into the mounting groove, the coil is provided in the protrusion, and the vibrating assembly is provided in the body part, and wherein the module casing is provided with an air outlet hole communicating with the rear acoustic cavity, an auxiliary diaphragm is provided at the air outlet hole, and a protective cover is provided on the outside of the auxiliary diaphragm.

11. An electronic device, comprising the speaker module according to claim 1.

* * * * *